(12) United States Patent
Macmanus et al.

(10) Patent No.: US 8,403,395 B2
(45) Date of Patent: Mar. 26, 2013

(54) VEHICLE SEAT

(75) Inventors: Steve Macmanus, Warwick (GB); Nick Stapleton, Nantwich (GB); Andrew Downie, Sandbach (GB); Paul Sharman, Hinkley (GB)

(73) Assignee: Bentley Motors limited (GB)

( * ) Notice: Subject to any disclaimer, the term of this patent is extended or adjusted under 35 U.S.C. 154(b) by 301 days.

(21) Appl. No.: 12/738,762

(22) PCT Filed: Oct. 20, 2008

(86) PCT No.: PCT/GB2008/003549
§ 371 (c)(1),
(2), (4) Date: Apr. 19, 2010

(87) PCT Pub. No.: WO2009/050495
PCT Pub. Date: Apr. 23, 2009

(65) Prior Publication Data
US 2010/0259062 A1    Oct. 14, 2010

(30) Foreign Application Priority Data

Oct. 20, 2007   (GB) .................................. 0720595.8
Sep. 16, 2008   (GB) .................................. 0816888.2

(51) Int. Cl.
*B60N 2/02*    (2006.01)
(52) U.S. Cl. ...................................................... 296/68.1
(58) Field of Classification Search ................ 296/68.1, 296/65.09; 180/268; 297/216.1, 216.12, 297/216.13; 280/733, 735, 801.1, 804, 808, 280/806
See application file for complete search history.

(56) References Cited

U.S. PATENT DOCUMENTS

| 2,117,932 | A | * | 5/1938 | Anker ....................... 297/216.18 |
| 3,929,374 | A | * | 12/1975 | Hogan et al. .................... 297/61 |
| 3,957,304 | A | * | 5/1976 | Koutsky et al. ............... 297/468 |
| 4,257,626 | A | * | 3/1981 | Adomeit ....................... 280/806 |
| 4,362,335 | A | * | 12/1982 | Drabert et al. ............ 297/300.3 |
| 5,295,729 | A | * | 3/1994 | Viano ...................... 297/216.14 |
| 5,324,095 | A | * | 6/1994 | Yamauchi ................ 297/344.14 |
| 5,533,775 | A | * | 7/1996 | Cyliax .......................... 296/68.1 |
| 5,642,916 | A |   | 7/1997 | Dybro et al. |
| 5,704,645 | A | * | 1/1998 | Arthurs et al. ............... 280/805 |
| 5,746,467 | A | * | 5/1998 | Jesadanont .................. 296/68.1 |
| 5,810,417 | A | * | 9/1998 | Jesadanont .................. 296/68.1 |
| 5,823,619 | A | * | 10/1998 | Heilig et al. ............. 297/216.12 |
| 6,050,637 | A | * | 4/2000 | Håland et al. ............ 297/216.14 |
| 6,158,810 | A | * | 12/2000 | Galloway ................... 297/354.1 |
| 6,179,330 | B1 | * | 1/2001 | Wier ............................. 280/806 |

(Continued)

FOREIGN PATENT DOCUMENTS

| EP | 1 371 518 | 12/2003 |
| GB | 2 336 136 | 10/1999 |

(Continued)

*Primary Examiner* — Kiran B Patel
(74) *Attorney, Agent, or Firm* — Salter & Michaelson

(57) ABSTRACT

A seat tensioner (14) for a vehicle seat (1,2) includes a restraint member (15) and means (16) for tensioning the restraint member. The restraint member (15) is connected between the seat and a vehicle in which it is mounted and the means for tensioning is operative to tension the restraint member to urge the vehicle seat towards the vehicle. The restraint member (15) may be a cable and the means for tensioning (16) a gas activated piston and cylinder device. Means for disconnecting the restraint member from the seat may be provided to enable the seat to be moved following deployment of the tensioner.

13 Claims, 11 Drawing Sheets

U.S. PATENT DOCUMENTS

| | | | |
|---|---|---|---|
| 6,179,379 B1* | 1/2001 | Andersson | 297/216.13 |
| 6,250,720 B1* | 6/2001 | Wier | 297/468 |
| 6,312,050 B1* | 11/2001 | Eklind | 297/216.15 |
| 6,336,662 B1* | 1/2002 | Kurita et al. | 280/801.1 |
| 6,354,659 B1* | 3/2002 | Andersson et al. | 297/216.14 |
| 6,450,576 B1* | 9/2002 | Rhein et al. | 297/250.1 |
| 6,601,915 B2* | 8/2003 | Sullivan et al. | 297/216.1 |
| 6,619,751 B1* | 9/2003 | Shah | 297/464 |
| 6,631,926 B2* | 10/2003 | Merrick et al. | 280/804 |
| 6,779,842 B2* | 8/2004 | McNeff | 297/250.1 |
| 6,811,199 B2* | 11/2004 | Nozaki | 296/63 |
| 6,866,296 B2* | 3/2005 | Webber et al. | 280/806 |
| 7,008,015 B2* | 3/2006 | Bischoff | 297/216.1 |
| 7,040,696 B2* | 5/2006 | Vits et al. | 297/216.13 |
| 7,216,931 B2* | 5/2007 | Friedman | 297/216.1 |
| 7,431,339 B2* | 10/2008 | Yamamoto | 280/801.1 |
| 7,588,289 B2* | 9/2009 | Bostrom et al. | 297/216.12 |
| 7,866,696 B2* | 1/2011 | Wang et al. | 280/748 |
| 7,997,374 B2* | 8/2011 | Eschbach | 180/268 |
| 2006/0097496 A1* | 5/2006 | Theisen et al. | 280/735 |
| 2008/0303325 A1* | 12/2008 | Scholz | 297/250.1 |
| 2009/0008919 A1* | 1/2009 | Mather et al. | 280/807 |
| 2009/0261569 A1* | 10/2009 | Bok et al. | 280/806 |
| 2010/0066151 A1* | 3/2010 | Usoro et al. | 297/481 |
| 2010/0089177 A1* | 4/2010 | Waite et al. | 73/862.391 |
| 2011/0140485 A1* | 6/2011 | Macmanus et al. | 297/216.1 |
| 2011/0221246 A1* | 9/2011 | Downie et al. | 297/216.1 |
| 2011/0227378 A1* | 9/2011 | Swierczewski | 297/216.15 |

FOREIGN PATENT DOCUMENTS

| | | |
|---|---|---|
| JP | 47-30324 | 12/1972 |
| JP | 59-104838 | 6/1984 |
| JP | 60-236 | 1/1985 |
| JP | 1-77533 | 5/1989 |
| JP | 4-137928 | 12/1992 |
| JP | 5-16716 | 1/1993 |
| JP | 5-338484 | 12/1993 |
| JP | 2004-122924 | 4/2004 |
| JP | 2008-213070 | 9/2008 |

* cited by examiner

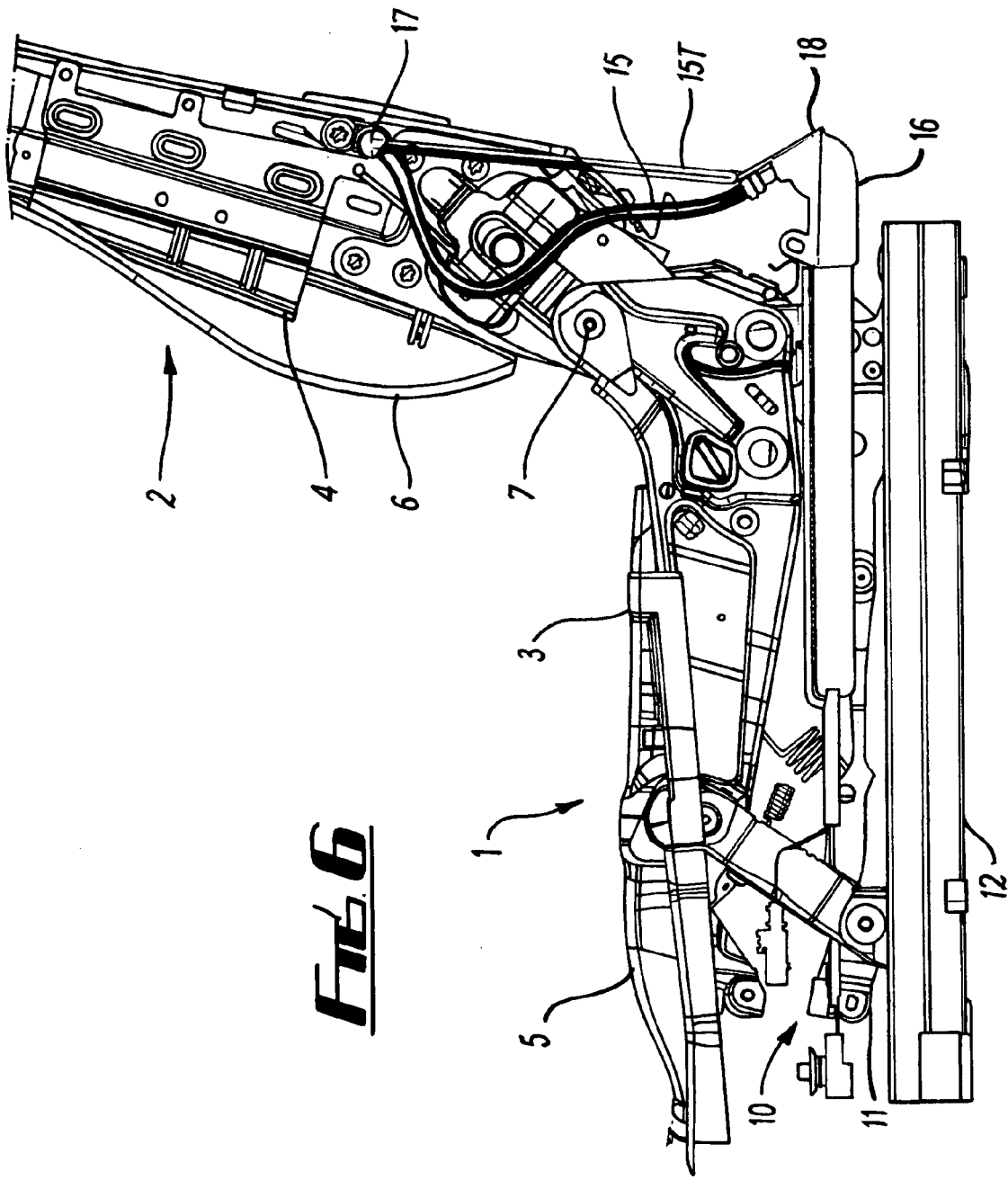

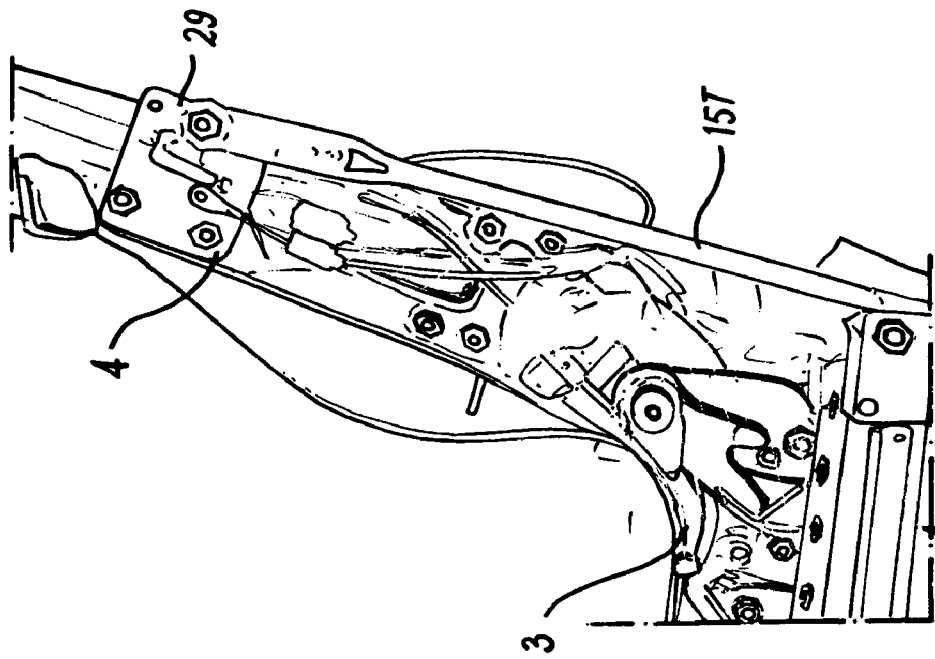
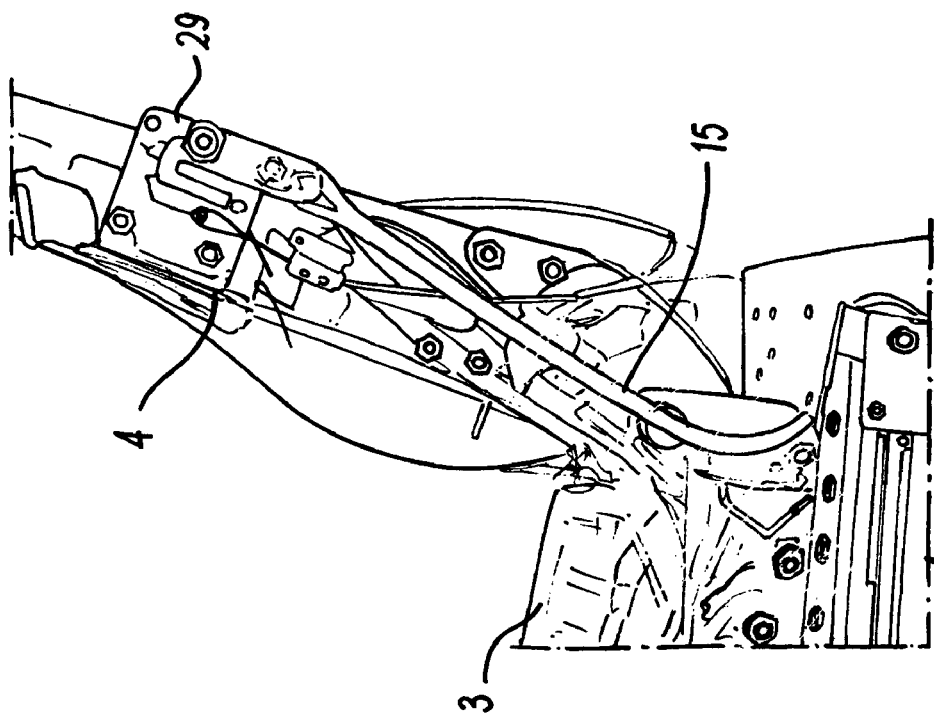

VEHICLE SEAT

TECHNICAL FIELD

The present invention relates to vehicle seat having a seat tensioner, particularly but not exclusively an automotive vehicle seat, and to a vehicle including a vehicle seat having a seat tensioner.

BACKGROUND OF THE INVENTION

Current automotive seats have become extremely complex in construction and this trend is continuing. Thus current automotive seats are routinely expected to provide for a whole variety of adjustments aimed at enhancing occupant comfort and safety. These adjustments include forward and backwards movement to enable the position of the seat on the longitudinal axis of the vehicle to be adjusted, and upward and downward adjustment to enable the position of the seat on the vertical axis of the vehicle to be adjusted. The forward and backward adjustment in turn enables the position of the front seats with respect to both the dashboard and the rear seats to be adjusted. The upward and downward adjustment in turn enables the height of seats with respect to the floor and roof of the vehicle to be adjusted. Where the seat in question is the driver's seat these adjustments enhance the ability of the driver to select the most comfortable and favourable driving position particularly with respect to the steering wheel. Other adjustments may provide for the adjustment of lumbar support, for the adjustment of headrests and for the adjustment of the squab part of the vehicle seat with respect to the seat part. This latter adjustment is usually a pivotal adjustment enabling the squab part to rotate or pivot with respect to the seat part. The mechanisms inherent in the provisions of all of these adjustments impart a certain degree of play or flexibility to a seat which would not be there without them. Whilst this is necessary under normal operating conditions it may be less desirable under impact conditions. It is an object of the invention to remove or mitigate this.

SUMMARY OF THE INVENTION

According to the present invention, there is provided a vehicle comprising a vehicle seat, a seat belt for the seat and characterized by a seat tensioner, the seat tensioner comprising a restraint member connected between the vehicle seat and the vehicle, and a tensioner operative to tension the restraint member to urge the vehicle seat towards the vehicle.

According to another aspect of the present invention, there is provided a vehicle seat comprising an integrally mounted seat belt and characterized by a seat tensioner comprising a restraint member connected to the vehicle seat at one end and adapted to connect directly or indirectly to a vehicle in which the seat is mounted at its other end, and a tensioner operative to tension the restraint member to urge the vehicle seat towards the vehicle.

According to still another aspect of the present invention, there is provided a seat tensioner system for a motor vehicle seat, comprising: a seat belt for the seat; a restraint member having opposed one and other ends with the one end attached to the seat; a tension member that is fixed to the vehicle and that is constructed and arranged to control the other end of the restraint member; said restraint member having an inactive position in which the seat is unrestrained, and a deployed position in which the tension member tensions the restraint member to thus urge the seat toward the vehicle; and a control member to control activation of the tension member in response to a signal representative of a vehicle impact condition.

In a preferred embodiment of the invention, the vehicle seat comprises a seat and a squab connected to the seat to be relatively movable with respect thereto. The restraint member may be connected to the seat or to the squab. The restraint member preferably comprises a flexible elongate member, advantageously a metal cable preferably made of a metal having a high tensile strength. Alternatively, the restraint member may be a rigid link advantageously made of a high tensile material such as a high tensile metal. The tensioner comprises a piston and cylinder device, advantageously a gas activated device. The seat comprises a fixed slide and a moveable slide. The fixed slide is adapted to be anchored to the floor of the corresponding vehicle and the movable slide may be moved forwardly and backwardly on the fixed slide to provide for corresponding movement of the vehicle seat longitudinally of the vehicle. A seat belt is advantageously provided for the seat. The belt may be integrally mounted on the seat or separately mounted. Electronic control means are provided to control activation of the tensioner in response to sensors providing signals under vehicle impact conditions.

A means may be provided for disconnecting the restraint member from the seat and/or vehicle. Such a means may advantageously be employed to release the restraint means after deployment of the seat tensioner to enable the seat to be moved relative to a vehicle in which it is mounted and in particular to allow the seat squab to be moved to the dumped position to allow access to rear seats of the vehicle. The means may comprise a latch. The latch may be manually operable. The latch is preferably operable by means of a squab release lever. If so, the latch is preferably arranged such that operation of the squab release lever will only cause the latch to release the restraint member if the seat tensioner has been deployed.

DESCRIPTION OF THE DRAWINGS

In order that the invention may be more clearly understood, embodiments thereof will now be described, by way of example, with reference to the accompanying drawings, in which:

FIG. 6 shows a partial side elevational view in section of a vehicle seat incorporating the seat tensioner of the invention;

FIG. 7 shows a partial side elevational view in section of a vehicle seat incorporating the seat tensioner of the invention;

FIG. 8 shows the vehicle seat of FIG. 7 with the seat tensioner actuated;

DETAILED DESCRIPTION

Figure 1:
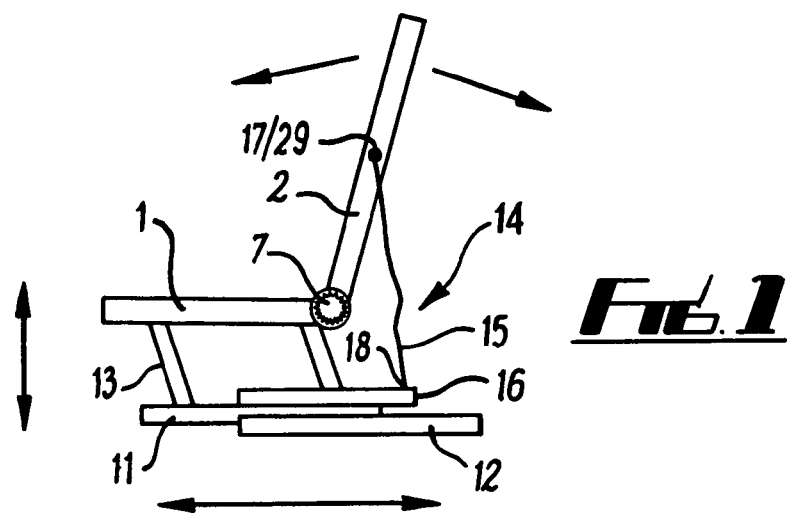
FIG. 1 diagrammatically shows a vehicle seat incorporating an embodiment of the invention in a fully forward and fully raised position.
Figure 2:
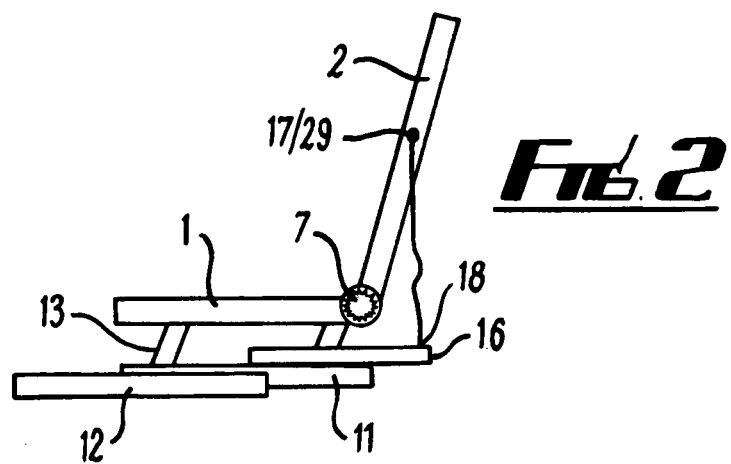
FIG. 2 diagrammatically shows the vehicle seat of FIG. 1 with the seat in a fully lowered and fully rearward position.
Figure 3:
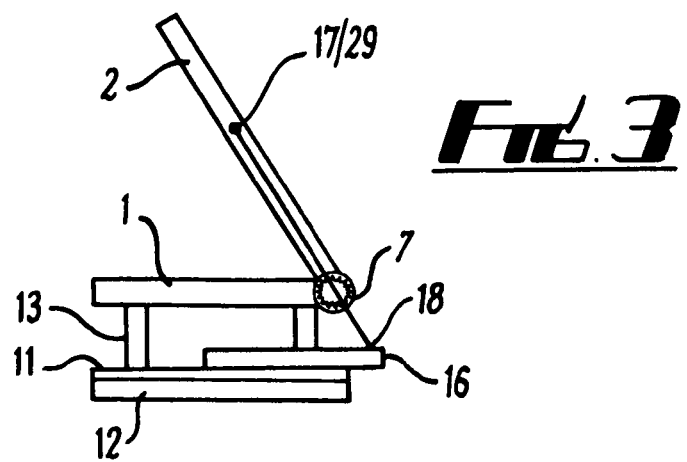
FIG. 3 diagrammatically shows the vehicle seat of FIGS. 1 and 2 with the squab of the seat in the dumped position.
Figure 4:
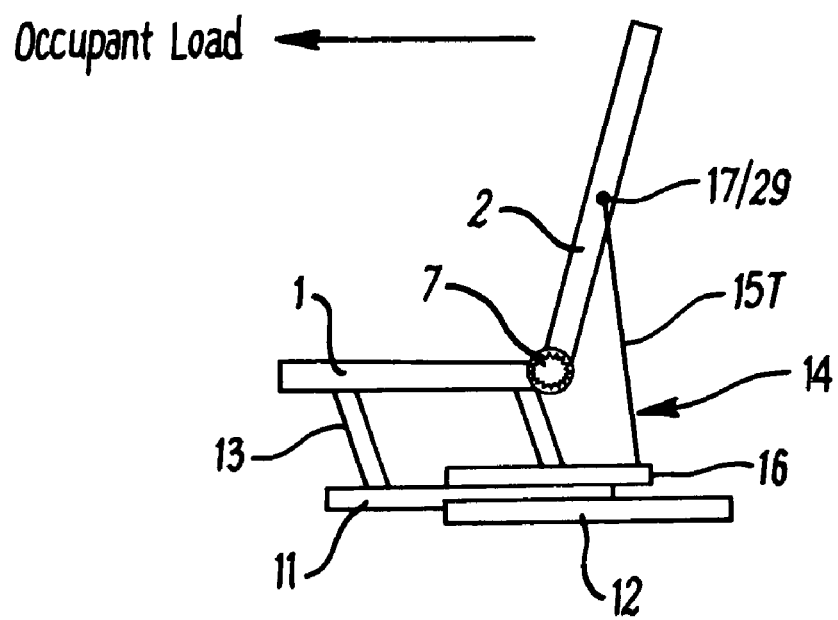
FIG. 4 diagrammatically shows the vehicle seat of FIGS. 1 to 3, with the seat tensioner actuated.
Figure 5:
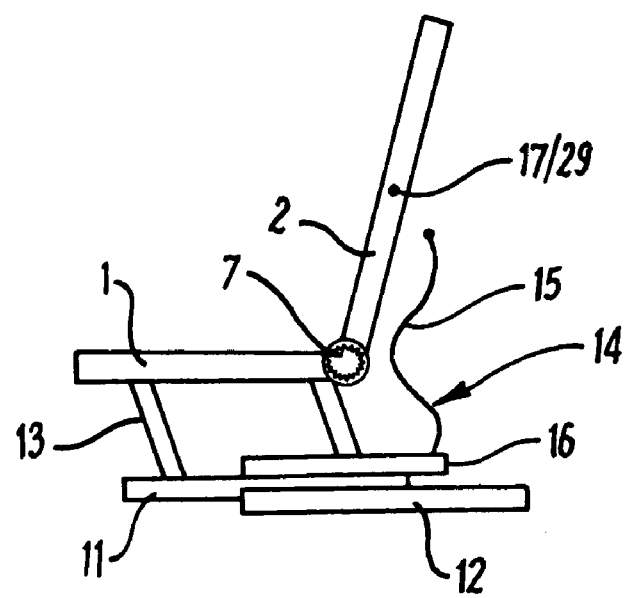
FIG. 5 diagrammatically shows the vehicle seat of FIGS. 1 to 4 with the seat tensioner released.
Figure 9:
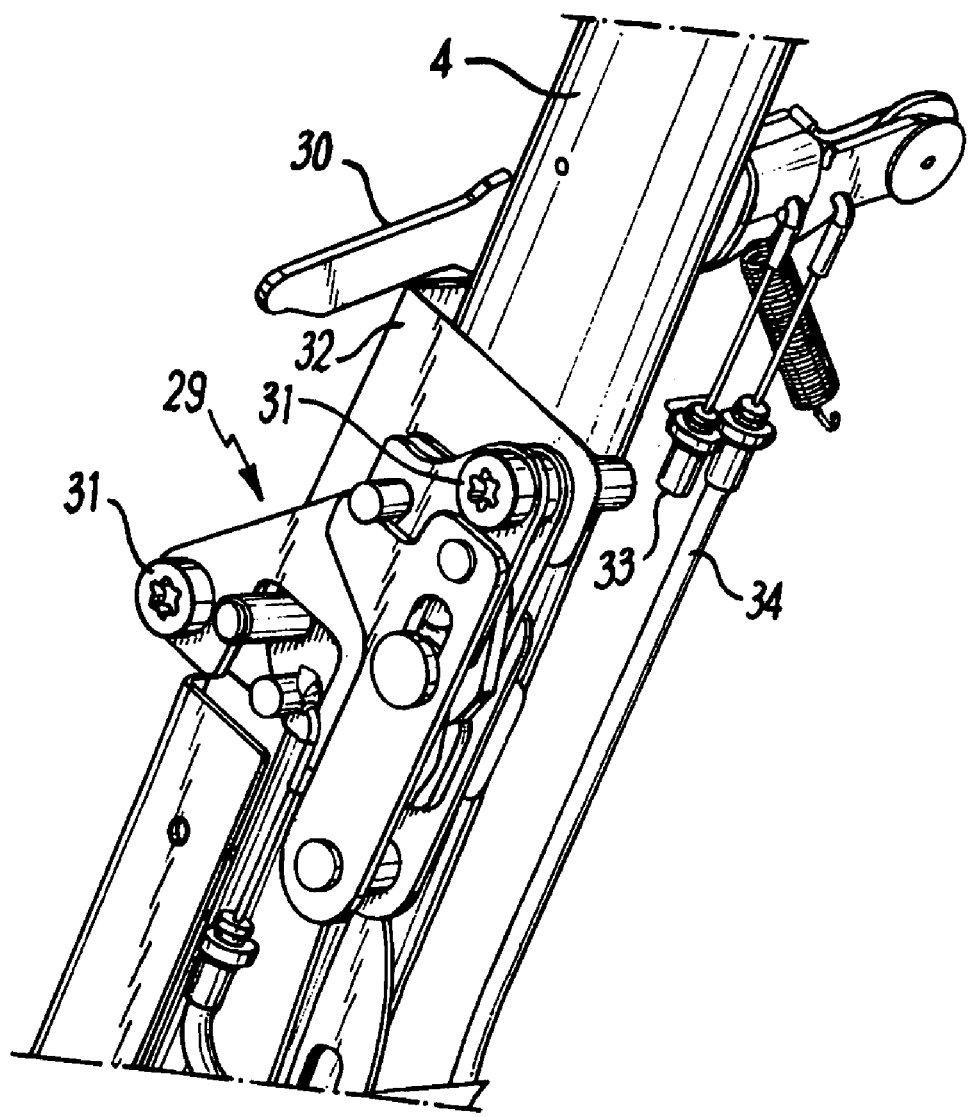
FIG. 9 shows a detailed view of the seat tensioner release latch mounted to the seat of FIGS. 7 and 8.
Figure 10:
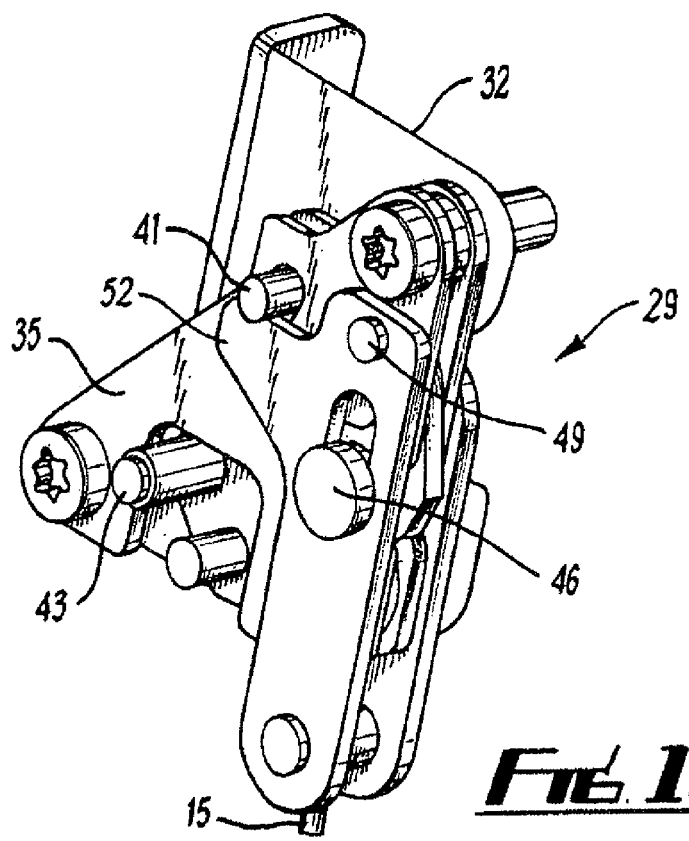
FIG. 10 shows the seat tensioner release latch of FIG. 9.
Figure 11:
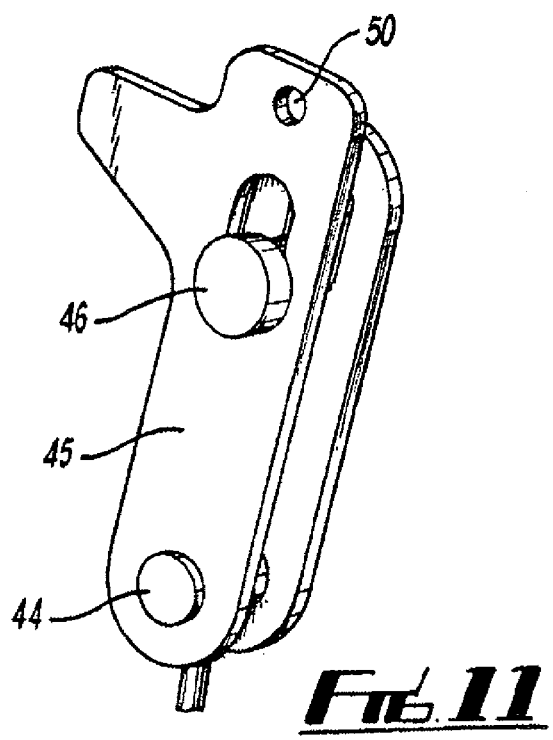
FIG. 11 shows the seat tensioner restraint member end fitting of the latch of FIG. 10.

Referring to FIGS. 1 to 15, vehicle seats comprise the usual seat 1 and squab 2 having respective metal frames 3 and 4 supporting respective upholstery 5 and 6 and pivotally connected together through a pivot 7 which enables the squab 2 to be pivoted forwardly and backwardly with respect to the seat 1. Seat 1 is mounted on a slide arrangement indicated generally by reference numeral 10. This slide arrangement 10 comprises a movable slide 11 and a fixed slide 12. The movable slide 11 is connected to the metal frame 3 and is slidable with respect to the fixed slide 12 which is fixed to the floor of the vehicle. This slide arrangement 10 enables the vehicle seat to be adjusted forwardly and backwardly along the longitudinal axis of the corresponding vehicle as shown diagrammatically in FIGS. 1 to 5. The seat is shown in its fully forward position in each of FIGS. 1 and 4 and in rearward positions in each of FIGS. 2 and 3. In FIG. 3 the squab 2 of the vehicle seat is shown in the "dumped" position in which it is pivoted forwardly about the seat 1 to enable access to the rear seats of a two door vehicle in the usual way. The seat 1 is also provided with a height adjustment mechanism indicated generally diagrammatically by reference numeral 13. This height adjustment mechanism enables the height of the vehicle seat to be adjusted upwardly and downwardly as desired with respect to the floor and roof of the vehicle. The vehicle seat is shown in its fully raised position in FIG. 1 and its fully lowered position in FIG. 2.

The vehicle seat incorporates a seat tensioner system indicated generally by reference numeral 14. The seat tensioner system 14 comprises a restraint member 15 and means indicated generally by reference number 16 for tensioning this restraint member. The restraint member, which in this embodiment is a flexible high tensile steel cable but may be a rigid metal link, is connected (by way of, in some embodiments, a latch 29) at one end to an anchorage 17 mounted on the metal frame 4 of the squab 2 and at its other end 18 to the tensioning means 16. The tensioning means 16 comprises a gas activated piston and cylinder device which is fixed to the moving slide 11 and through the fixed slide 12 to the floor of the vehicle.

Figure 17:
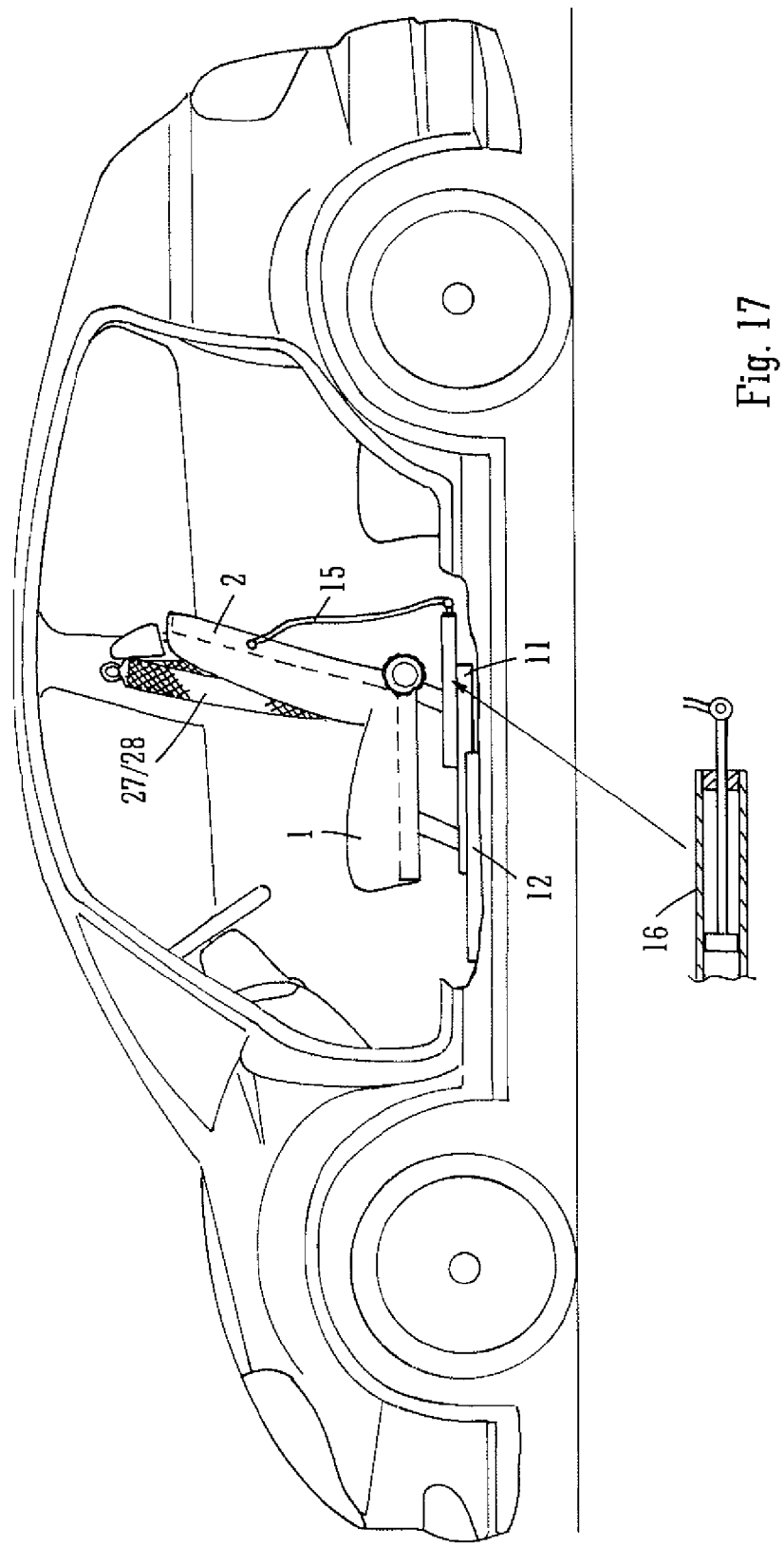
FIG. 17 is a schematic diagram illustrating the tensioner in a vehicle.

Refer to FIG. 17 for further details of the vehicle seat including the seat 1 and squab 2. The tensioning member 16 is schematically illustrated as a gas activated piston and cylinder device. FIG. 17 also illustrates the seatbelts 27, 28.

Under normal operating conditions, the seat tensioner is inactive and the cable 15 is slack. Any required vehicle seat adjustments may therefore be made without any interference from the seat tensioner, and in particular the seat squab may be tilted forward to the dumped position shown in FIG. 3 to allow access for rear seat passengers to a two door vehicle. In the event of an accident causing an impact to the vehicle severe enough to deploy the tensioner, the tensioning means 16 are activated pulling the cable 15 taut (as shown at 15T in FIGS. 4, 5 and 8) and tying the vehicle seat and its occupant more securely to the vehicle floor thus resisting any tendency for the seat and its occupant to pivot forwardly. The seat belt may be integral with the vehicle seat or separate from it.

An integral seat belt has an upper anchor for the shoulder belt mounted on top of the metal frame 4 of the squab 2. This provides for better belt fit, better belt access and greater comfort for the wearer. It also, however, removes an anchorage point to the body of the vehicle as compared with a non-integral seat belt which has a mounting point for the shoulder belt on the frame of the vehicle itself. This results in an increased load being placed on the vehicle seat by its occupant in the event of a vehicle impact. Although not particularly shown seats are also generally provided with head rests which are also usually adjustable on the top of the squab 2 of the seat.

Following deployment of the tensioner, with the embodiment shown in FIGS. 7 and 8 the tensioner prevents the seat squab 2 being moved to the dumped position. This creates a problem for two door, vehicles as the tensioner then impedes access to the rear seats of the vehicle restricting or preventing the escape of rear seat passengers from the vehicle following an impact, and preventing emergency services gaining access to rear seat passengers which may be necessary following a severe impact.

This problem is overcome by the embodiments shown in FIGS. 1 to 5 and 7 to 15, where the seat tensioner restraint member 15 is mounted to the seat squab 2 by way of a releasable latch 29. The latch 29 allows the restraint member 15 to be disconnected from the seat squab 2, following actuation of the tensioner, allowing the squab 2 to be moved to the dumped position.

With the embodiment of FIGS. 7 to 15 the seat tensioner release latch 29 is arranged to release the restraint member 15 on actuation of a squab release lever 30 normally used to unlock the squab 2 relative to the seat 1 to enable the squab 2 to be moved to the dumped position, but only to release the restraint member after deployment of the seat tensioner.

Referring now to FIGS. 9 to 15, the seat tensioner release latch 29 is mounted by way of two fasteners 31 to a mounting bracket 32 to the seat squab 2 frame 4. Also mounted to the squab frame 4 is a squab release lever 30. The lever 30 is arranged to operate two Bowden cables 33, 34. The first cable 33 is only partially shown in FIG. 9 and would in practice be connected to a conventional squab release latch, operation of which enables the seat squab 2 to be moved to the dumped position. The second Bowden cable 34 is connected to the seat tensioner release latch 29.

The seat tensioner release latch 29 comprises two side plates 35 mounted together in a spaced apart manner by way of spacer rivets 36. Between the side plates 35 are mounted upper and lower latch members 37, 38 (upper and lower in the illustrated orientation), by way of respective pivotal mountings 39, 40. A pin 41 extends from one side of the upper latch member 37, through an arcuate slot 42 in the adjacent side member 35.

Figure 12:
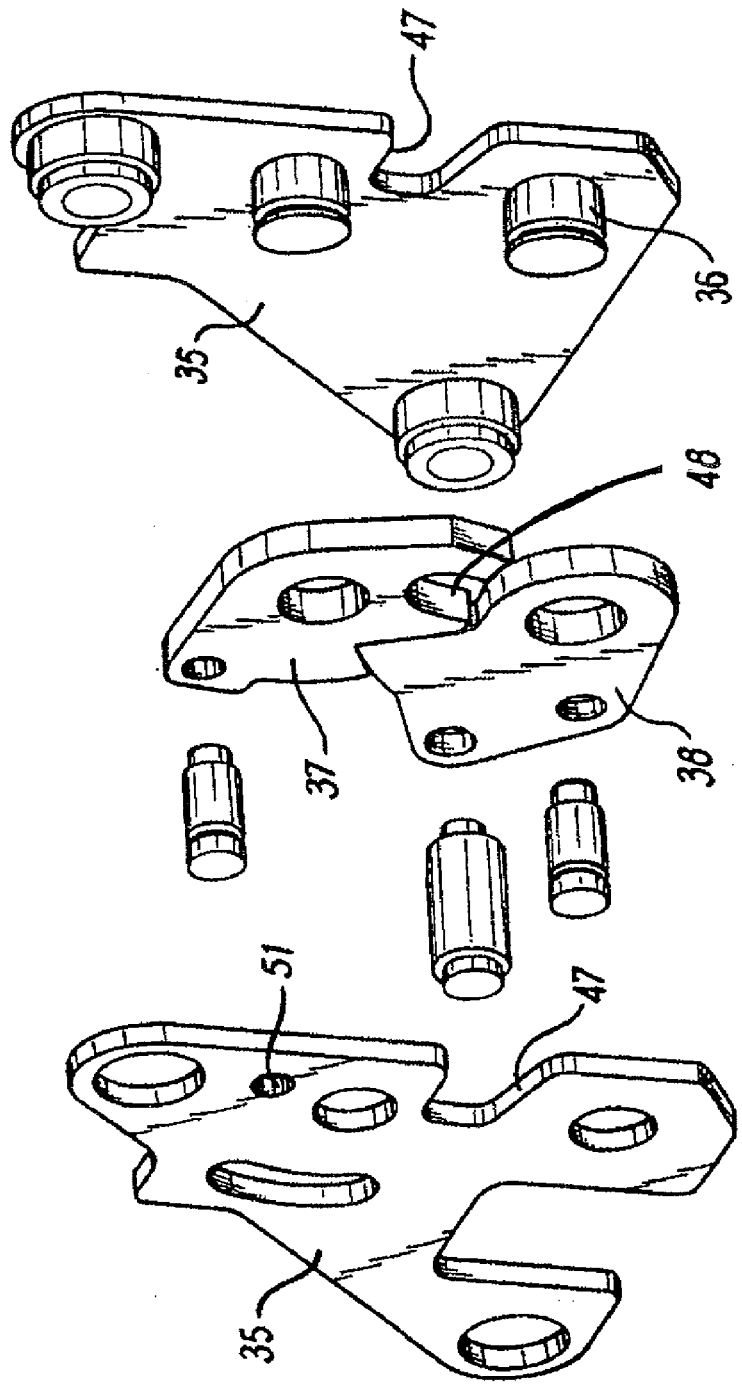
FIG. 12 shows an exploded view of the latch of FIG. 10 without the seat tensioner restraint member end fitting.
Figure 13:
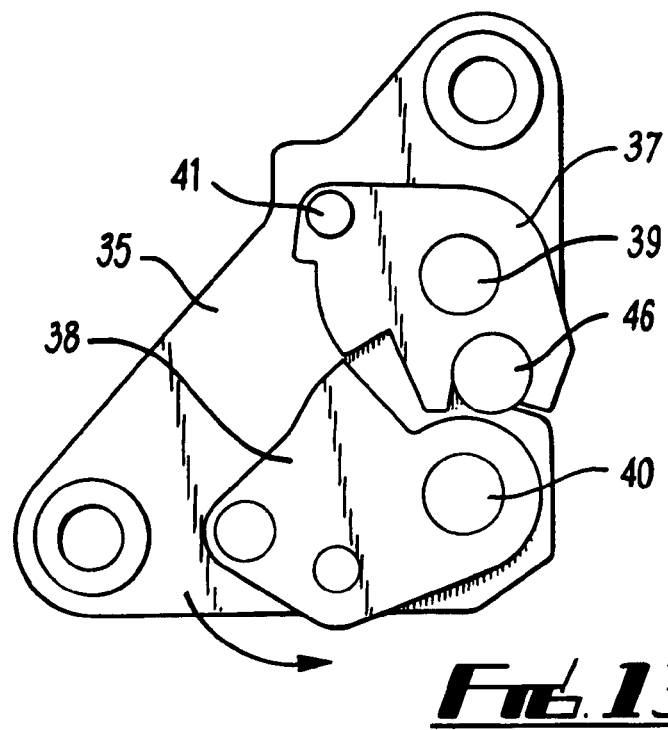
FIG. 13 shows a cut-away view of the latch of FIG. 10 during normal operation.
Figure 14:
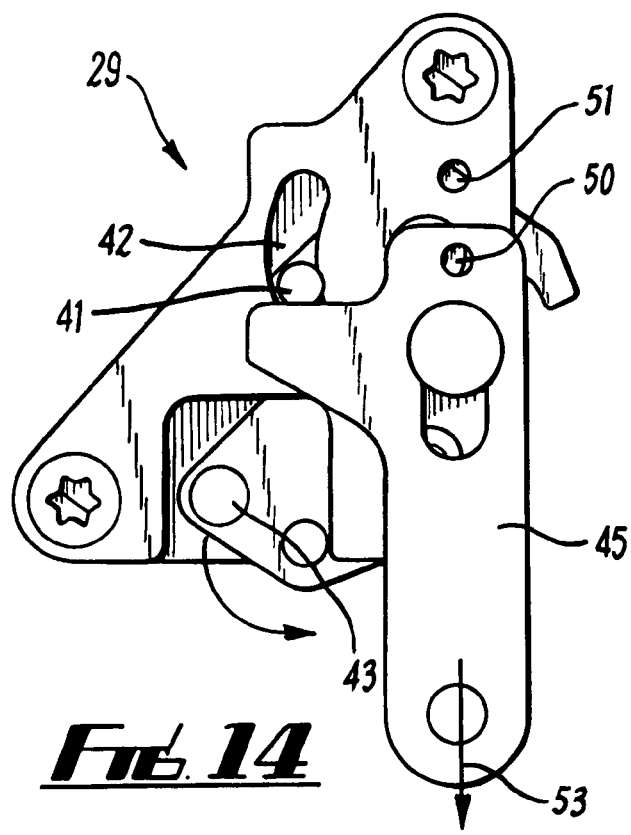
FIG. 14 shows the latch of FIG. 10 with the seat tensioner activated.
Figure 15:
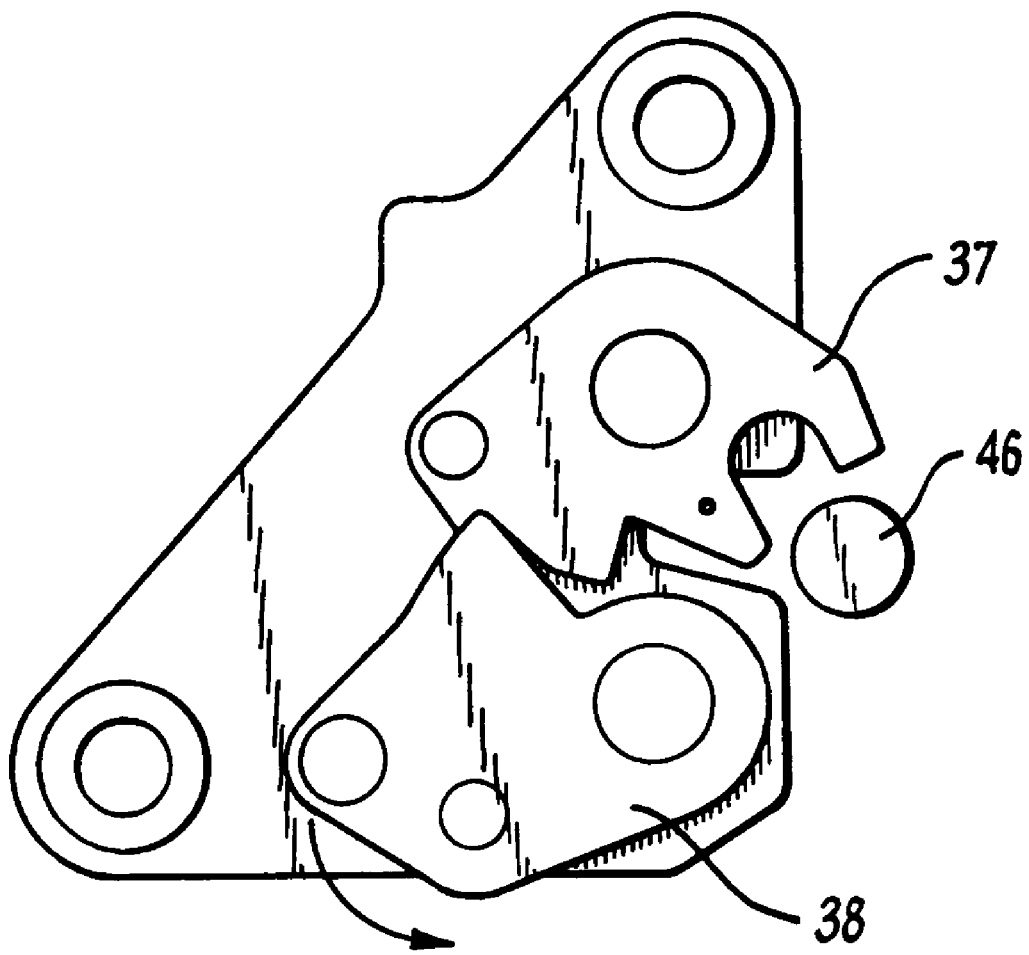
FIG. 15 shows operation of the latch of FIG. 10 following activation of the seat tensioner.

The Bowden cable 34 is connected to a pin 43 on the lower latch member 38, such that operation of the squab release lever 30 causes the lower latch member 38 to rotate around pivot 40 in the direction shown by arrows in FIGS. 13 and 14 and from the position shown in FIG. 12 when the seat squab 2 is locked to the position shown in FIGS. 13 and 15 when the seat squab is released.

The end of the restraint member 15 (in this embodiment a steel cable) is connected to a pin 44 which extends through respective apertures towards one end of each of two substantial parallel plates of an end fitting 45.

Towards the other end of the end fitting 45 an elongate slot is formed in each end plate and a pin 46 extends through the slot in both plates. In the assembled latch 29 the plates of the end fitting 45 lie outside the side plates and the pin 46 is received into a slot 47 in the side plates, where it is captured through being received by a slot 48 in the upper latch member 37.

A sacrificial pin 49 extends through respective apertures 50,51 in the end fitting 45 and side plate 35 securing the end fitting relative to the side plate 35.

The plate of the end fitting 45 which lies adjacent the side plate 35 through which the pin 41 of the upper latch member projects includes an arm 52 against which the pin bears. Whilst the sacrificial pin 49 is in tact the end fitting 45 is retained relative to the side plates 35 such that the arm 52 of the end fitting 45 holds the pin 41 of the upper latch member 37 towards the top of the arcuate slot 42 in the side plate. Thus the upper latch member 37 is retained in the position shown in FIG. 13 irrespective of the position of the lower latch member 40 and the pin 46 of the end fitting is captured by the latch 29.

On deployment of the seat tensioner a force in the direction of arrow 53 is applied to the restraint member 15, and in turn to the end fitting 45. This force is arranged to be sufficient to shear the sacrificial pin 49 and allow the end fitting 45 to move downward in the direction of arrow 53 until the pin 46 is caught by the top of the elongate slot in the end fitting. Force applied by the restraining member 15 is thus transmitted to the seat squab via the pin 46 and latch 29.

Movement of the end fitting 45 relative to the remainder of the latch 29 also results in arm 52 allowing pin 41 of the upper latch member 37 to move within the arcuate slot 42 of the side member and hence the upper latch member to rotate. In most impact situations, though, it is to be expected that the squab release lever will not be operative, in which case the lower latch member will be in the position shown in FIG. 12 and prevent movement of the upper latch member 37.

However, when the squab release lever 30 is next operated and the lower latch member 40 rotated to the position shown in FIG. 13, the upper latch member is now free to rotate to the position shown in FIG. 15, releasing pin 46 and thereby disconnecting the restraint member 15 from the seat squab 2 thereby allowing the squab 2 to be moved to the dumped position.

Figure 16:
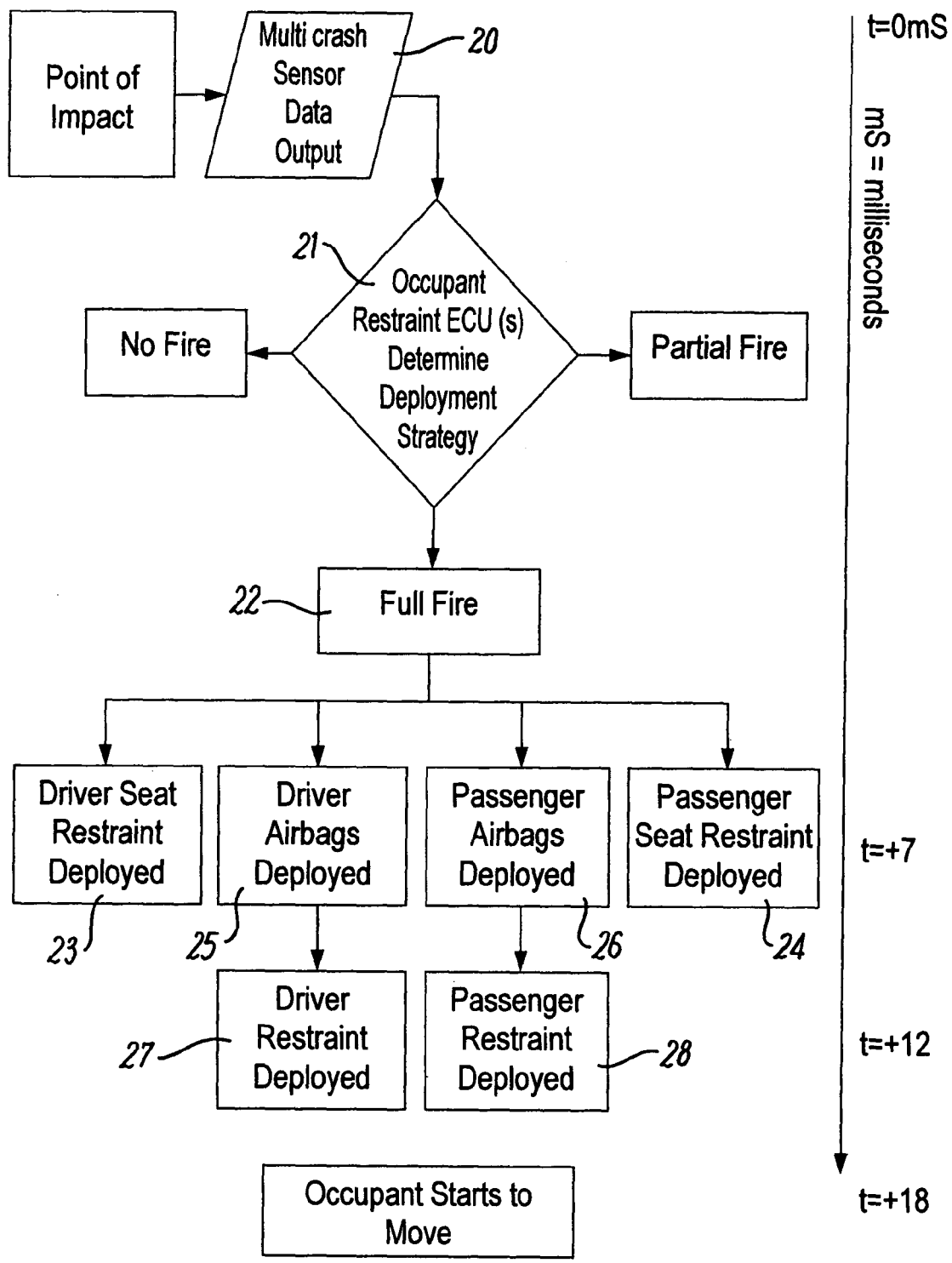
FIG. 16 is a flow diagram illustrating operation of the seat tensionsers of FIGS. 1 to 15.

In practice full, or no fire of the tensioning means 16 may be provided for under the control of an occupant restraint electronic control unit 21 (ECU) which is programmed to determine restraint deployment in dependence upon impact conditions sensed by a series of impact sensors. Operation of the system following an impact will now be described with reference to the flow diagram shown in FIG. 16. Immediately, following impact information gathered by sensors 20 in the vehicle concerning the impact is sent to the ECU 21 which determines restraint deployment in dependence upon the nature and severity of the impact. In the event of a full fire 22, the seat restraints 23, 24 on both the driver's and the front passenger's seats are deployed as are the driver and the passenger airbags 25, 26 and subsequently the driver and passenger seatbelts 27, 28. In the event of a partial fire, device 16 would fire but certain of the airbags may not fire. The time delay from the point of impact when these events take place is shown on the vertical axis T on the right hand side of the diagram. These events all take place before the occupants themselves begin to move. Deployment of this arrangement limits forward travel of seat and occupant, under vehicle impact conditions, resulting in increased safety.

It will be appreciated that the above embodiment has been described by way of example only and that many variations are possible without departing from the scope of the invention. For example, although in the embodiment described, the restraint member 15 is connected to the squab of the vehicle seat it could alternatively be connected to the seat, although this would not directly oppose movement of the squab with respect to the seat.

REFERENCE NUMERALS

1. Seat
2. Squab
3. Metal frame
4. Metal frame
5. Upholstery
6. Upholstery
7. Pivot
10. Slide arrangement
11. Movable slide
12. Fixed slide
13. Height adjustment mechanism
14. Seat tensioner system
15. Restraint member
16. Means for tensioning restraint member
17. Anchorage
18. Other end of restraint member
20. Sensors
21. Electronic control unit
22. Full fire
23. Seat restraint
24. Seat restraint
25. Passenger airbag
26. Passenger airbag
27. Passenger seatbelt
28. Passenger seatbelt
29. Latch
30. Squab release lever
31. Fastener
32. Mounting bracket
33. Bowden cable
34. Bowden cable
35. Side plates
36. Spacer rivets
37. Upper latch members
38. Lower latch member
39. Pivotal mounting
40. Pivotal mounting
41. Pin
42. Arcuate slot
43. Pin
44. Pin
45. End fitting
46. Pin
47. Slot
48. Slot
49. Sacrificial pin
50. Aperture
51. Aperture
52. Arm
53. Arrow

What is claimed is:

1. A vehicle comprising a vehicle seat (1) and a squab (2) connected to the seat to be relatively movable with respect thereto, a seat belt for the seat and a seat tensioner, and a squab release lever (30), the seat tensioner comprising a restraint member (15) coupled between the vehicle seat and the vehicle, a tensioner (16) operative to tension the restraint member to urge the vehicle seat towards the vehicle, and a latch (29) operable by the squab release lever for disconnecting the restraint member from the seat and/or vehicle when the tensioner is deployed, the latch being arranged such that operation of the squab release lever causes the latch to release the restraint member if the tensioner has been deployed.

2. A vehicle as claimed in claim 1, wherein the restraint member is a flexible elongated member (15).

3. A vehicle as claimed in claim 1 wherein the tensioner comprises a piston and cylinder device (16).

4. A vehicle as claimed in claim 1, wherein the restraint member (15) has opposed one and other ends with the one end attached to the seat.

5. A vehicle as claimed in claim 4, wherein the tensioner (16) is fixed to the vehicle and is constructed and arranged to control the other end of the restraint member.

6. A vehicle as claimed in claim 5, wherein the restraint member (15) has an inactive position in which the seat is unrestrained, and a deployed position in which the tensioner tensions the restraint member to thus urge the seat toward the vehicle.

7. A vehicle seat as claimed in claim 1 wherein the latch comprises a sacrificial pin (49) arranged to shear when the means for tensioning the restraint member is deployed.

8. A vehicle seat as claimed in claim 1, wherein the vehicle seat comprises a fixed slide (12) and a moveable slide (11), the fixed slide being anchored to the floor of the vehicle and the movable slide being moveable forwardly and backwardly on the fixed slide to provide for corresponding movement of the vehicle seat longitudinally of the vehicle.

9. A vehicle claimed in claim 1, wherein the seat belt comprises an integrally mounted seatbelt.

10. A vehicle as claimed in claim 1, comprising an electronic control means (21) to control activation of the tensioner in response to one or more sensors providing signals under vehicle impact conditions.

11. A vehicle as claimed in claim 1, wherein the latch comprises a first latch member (37) moveable from a first position, in which the first latch member attaches the restraint member to the latch, and a second position, in which it releases the restraint member from the latch, and a sacrificial pin (49) arranged to shear when the tensioner is deployed, and wherein the latch is arranged such that when the sacrificial pin is intact, operation of the squab release lever does not move the first latch member from the first position to the second position and when the sacrificial pin is sheared, operation of the squab release lever causes the first latch member to move from the first position to the second position, thereby releasing the restraint member from the latch.

12. A vehicle as claimed in claim 11 wherein the latch comprises an end fitting (45) which is attached to one end of the restraint member and is moveable from a first position, in which the end fitting prevents the first latch member from moving from its first position to its second position on operation of the squab release lever, to a second position, in which the end fitting allows the first latch member to move from its first position to its second position on operation of the squab release lever, wherein when the seat tensioner has not been deployed the end fitting is retained in its first position by the sacrificial pin and on deployment of the seat tensioner the end fitting moves from its first position to its second position, thereby shearing the sacrificial pin.

13. A vehicle as claimed in claim 11, wherein the latch comprises a second latch member (38) arranged to move from a first position to a second position on operation of the squab release lever, wherein, when the second latch member is in the first position, it acts to retain the first latch member in the first position and when the second latch member is in the second position, it allows the first latch member to move from its first position to its second position.

* * * * *